United States Patent
Reiser

(10) Patent No.: US 6,572,992 B2
(45) Date of Patent: Jun. 3, 2003

(54) GAS INJECTION SYSTEM FOR TREATING A FUEL CELL STACK ASSEMBLY

(75) Inventor: Carl A. Reiser, Stonington, CT (US)

(73) Assignee: UTC Fuel Cells, LLC, South Windsor, CT (US)

( * ) Notice: Subject to any disclaimer, the term of this patent is extended or adjusted under 35 U.S.C. 154(b) by 182 days.

(21) Appl. No.: 09/769,598

(22) Filed: Jan. 25, 2001

(65) Prior Publication Data

US 2001/0002299 A1 May 31, 2001

Related U.S. Application Data

(62) Division of application No. 09/243,225, filed on Feb. 3, 1999, now Pat. No. 6,238,817.

(51) Int. Cl.[7] .............................. H01M 8/00; H01M 2/00
(52) U.S. Cl. ........................ 429/13; 429/17; 429/34
(58) Field of Search ........................ 429/13, 17, 19, 429/12, 34, 38, 39; 137/602, 594, 2, 13; 123/304

(56) References Cited

U.S. PATENT DOCUMENTS 3,994,748 A * 11/1976 Kunz et al. .................... 429/13
6,238,817 B1 * 5/2001 Reiser .......................... 429/34

* cited by examiner

Primary Examiner—Stephen Kalafut
Assistant Examiner—R Alejandro
(74) Attorney, Agent, or Firm—McCormick, Paulding & Huber LLP

(57) ABSTRACT

A gas injection method for treating an electrochemical fuel cell stack assembly, the fuel cell stack assembly being repeatedly injected with an oxidizing gas at critical locations along the fuel cell stack assembly so that the fuel supply and the oxidizing gas will chemically react to reduce at least one harmful contaminant within the fuel supply. The preferred gas injection method treats a fuel cell stack assembly to reduce the debilitating effects of extraneous carbon monoxide within the fuel supply and thus preserves the efficient operation of the fuel cell stack assembly.

7 Claims, 3 Drawing Sheets

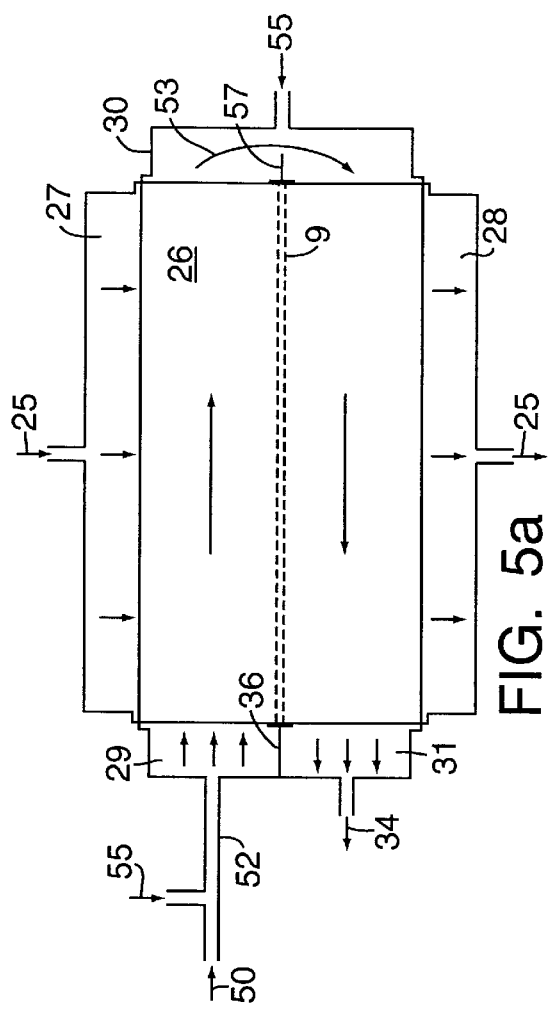
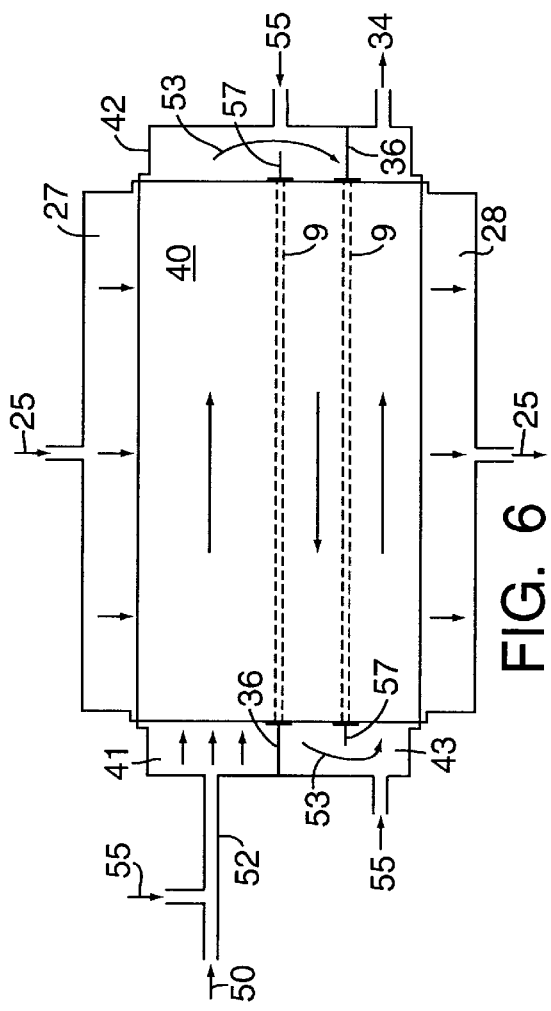
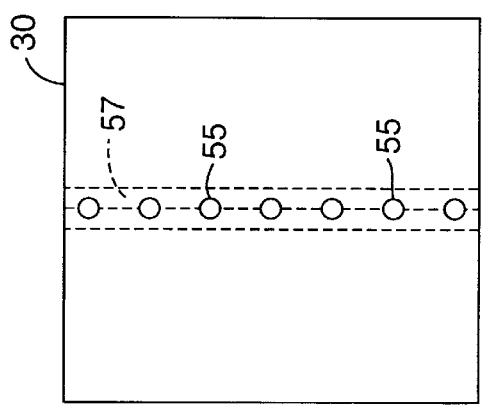

GAS INJECTION SYSTEM FOR TREATING A FUEL CELL STACK ASSEMBLY

CROSS REFERENCE TO RELATED APPLICATION

This application is a divisional of U.S. patent application Ser. No. 09/243,225, filed on Feb. 3, 1999, entitled "A GAS INJECTION SYSTEM FOR TREATING A FUEL CELL STACK ASSEMBLY", herein incorporated by reference in its entirety now U.S. Pat. No. 6,238,817.

FIELD OF THE INVENTION

This invention relates, in general, to a gas injection system for treating a fuel cell stack assembly to reduce the debilitating effects of extraneous carbon monoxide, and deals more particularly with a process by which an oxidizing gas is injected at critical locations along the fuel cell stack assembly, the ensuing chemical reaction thereby preserving the efficient operation of the fuel cell stack assembly.

BACKGROUND OF THE INVENTION

Electrochemical fuel cells are known for their ability to produce electricity and a subsequent reaction product through the interaction of a fuel being provided to an anode and an oxidant being provided to a cathode, thereby generating an electrical potential between these electrodes which results in a current flow when an external load is applied. Such fuel cells are very useful and sought after due to their high efficiency, as compared to conventional combustion systems, and the environmentally friendly reaction by-products, such as water, that are produced. Fuel cells, which are classified by electrolyte type, operate under different temperature constraints, as will be discussed shortly. As a result, a problem may arise in lower temperature fuel cells due to the affinity that the catalysts have in adsorbing, among other substances, carbon monoxide (hereinafter, CO) which often is a constituent in the fuel supply.

Electrochemical fuel cells typically employ hydrogen as the fuel and oxygen as an oxidant where, as noted above, the reaction by-product is water. One type of electrochemical fuel cell employs a membrane consisting of a solid polymer electrolyte, or proton exchange membrane (PEM) disposed between the two electrodes formed of porous, electrically conductive sheet material—typically a carbon fiber paper substrate. The PEM has a catalyst layer formed thereon at the membrane-electrode interface so as to promote the desired electrochemical reaction.

In operation, hydrogen fuel permeates the porous electrode material of the anode and reacts with the catalyst layer to form hydrogen ions and electrons. The hydrogen ions migrate through the membrane to the cathode and the electrons flow through an external circuit to the cathode. At the cathode, the oxygen-containing gas supply also permeates through the porous electrode material and reacts with the hydrogen ions and the electrons from the anode at the catalyst layer to form the by-product water. Not only does the ion exchange membrane facilitate the migration of these hydrogen ions from the anode to the cathode, but the ion exchange membrane also acts to isolate the hydrogen fuel from the oxygen-containing gas oxidant.

Conventional fuels cells have the ion exchange membrane positioned between two gas-permeable, electrically conductive plates, referred to as the anode and cathode plates. The plates are typically formed from graphite, a graphite composite, or the like and may be porous or dense. The plates act as a structural support for the two porous, electrically conductive electrode substrates, as well as serving as current collectors and providing the means for carrying the fuel and oxidant to the anode and cathode, respectively. They are also utilized for carrying away the reactant product water during operation of the fuel cell. When channels are formed within these plates for the carrying of fuel or oxidant, they are referred to as fluid flow field plates. When these plates simply overlay channels formed in the anode and cathode porous material, they are referred to as separator plates. The plates furthermore may have formed therein reactant feed manifolds which are utilized for supplying fuel to the anode or, alternatively, oxidant to the cathode. They also have corresponding exhaust manifolds to direct unreacted components of the fuel and oxidant streams, and any water generated by the reaction, from the fuel cell. Alternatively, the manifolds may be external to fuel cell itself, as shown in commonly owned U.S. Pat. No. 3,994,748 issued to Kunz et al., incorporated herein by reference in its entirety.

Multiple electrically connected fuel cells consisting of two or more anode plate/membrane/cathode plate combinations are referred to as a fuel cell stack assembly (CSA). A cell stack assembly is typically electrically connected in series.

The catalyst is typically a carbon supported platinum or platinum alloy, although other noble metals or noble metal alloys may be utilized. The efficiency of these catalyst layers are greatly diminished by contaminants which may adhere to the surface of the catalyst and thereby block the adsorption and reaction of the hydrogen fuel. In particular, CO exhibits a high rate of adsorption onto the platinum catalyst at temperatures below approximately 150° C. and effectively poisons the hydrogen reaction at similarly low temperatures.

The use of fuel cells with proton exchange membranes (PEM), sold by DuPont under the tradename NAFION™, is particularly widespread. These fuel cells are especially sensitive to CO poisoning as such cells must contain significant amounts of water and therefore cannot typically operate at temperatures over 100° C., while preferably being operated at approximately 80° C. At these temperatures, CO strongly adsorbs onto the catalyst surface to quickly diminish the performance of the PEM fuel cell. It has been determined that a fuel stream having a concentration of CO being approximately 0.05% (500 ppm) or larger causes an unacceptable performance loss for currently known PEM fuel cells.

It is known to supply a fuel cell with pure hydrogen gas as a fuel, thereby ensuring that no CO performance losses will occur. These systems, however, suffer from the expense and difficulty of producing and storing pure hydrogen gas in quantities sufficient for extended operation. The alternative to a pure hydrogen supply is to produce a hydrogen-rich gas stream where the fuel supply is an easily compressible gas or liquid hydrocarbon such as methane, natural gas or gasoline. This conversion of a hydrocarbon fuel into a hydrogen-rich gas stream is generally accomplished through the use of a steam reformer and a shift converter in combination, effectuating a reduction in the concentration of CO to approximately 0.2% (2000 ppm).

It has been known to further reduce the CO levels in the fuel stream through the injection of ($O_2$) oxygen or air into the hydrogen-rich fuel stream, an example of which is shown in U.S. Pat. No. 5,432,021, as well as disclosed by the assignee of the present invention within U.S. Pat. No. 5,330,727, incorporated herein by reference in its entirety.

The addition of oxygen oxidizes the CO and works to prevent the poisoning of the fuel cell catalyst. It has been found that at least three chemical reactions take place when $O_2$ is injected in this way, as shown by the following chemical equations:

1] $CO + \frac{1}{2}O_2 = CO_2$, the desired reaction whereby the CO is oxidized into carbon dioxide;

2] $H_2 + \frac{1}{2}O_2 = H_2O$, an undesired reaction of hydrogen fuel into water; and 3] $CO_2 + H_2 \Leftrightarrow H_2O + CO$, another undesirable reaction termed a reverse water-shift reaction producing both water and CO.

It should be noted that in this oxidizing process, the prevalent reaction is for the CO to react with the injected $O_2$, as seen in equation 1. When the amount of CO becomes depleted along the length of the reaction chamber or catalyst bed, the injected $O_2$ reacts with the existing $H_2$, thereby consuming the majority of the remaining oxygen, as seen in equation 2, and undesirably depleting the amount of available fuel through the production of water. Additionally, in the now oxygen-poor environment, a reverse water-shift reaction takes place whereby the resultant $CO_2$ and remaining $H_2$ react according to equation 3, increasing once again the concentration of CO. For this process to be useful, the temperature of the PEM fuel cell must be carefully regulated. Higher temperatures result in faster reaction rates and more quickly give rise to the undesirable reactions in equations 2 and 3. Lower temperatures may not provide enough of a conversion of CO to $CO_2$ to enable the fuel cell to operate. A balancing of temperature and fuel cell size must therefore be arranged. It is also necessary to provide some heat exchange system whereby the heat generated during the reaction process is extracted so as not to adversely effect the fuel cell operation.

With the forgoing problems and concerns in mind, it is the general object of the present invention to provide a treatment process for a fuel cell which overcomes the above-described drawbacks, as well as to affirmatively maximize the efficiency of the fuel cell in light of the heat generated during the reaction process.

SUMMARY OF THE INVENTION

It is an object of the present invention to inject an oxidizing gas into a fuel supply at a plurality of locations along the length of a fuel cell stack assembly.

It is another object of the present invention to reduce the amount of carbon monoxide within the fuel supply of the fuel cell stack assembly to prevent contamination of the anode catalyst layer within each fuel cell.

It is another object of the present invention to more evenly distribute the heat in the fuel cell stack assembly generated through the chemical reaction between the fuel supply and the oxidizing gas.

It is another object of the present invention to reduce the total amount of oxidizing gas needed to completely treat the fuel supply of the fuel cell stack assembly and thereby reduce the hydrogen consumed and the heat generated through the chemical reaction between the fuel supply and the oxidizing gas.

According to one embodiment of the present invention, a CSA having a plurality of electrochemical fuel cells includes a plurality of gas injection locations for treating a fuel supply of the CSA. Moreover, the CSA includes a fuel inlet manifold for directing the fuel supply to the fuel cells and a fuel exhaust manifold for expelling the fuel supply from the fuel cells, both the fuel inlet and exhaust manifolds being arranged to be in fluid communication with the CSA. The fuel supply of the CSA travels a fuel path from the fuel inlet manifold, through the CSA and out the fuel exhaust manifold.

A downstream treatment apparatus injects the fuel supply with the oxidizing gas at a first location along the fuel path downstream of the fuel inlet manifold, but before the fuel exhaust manifold.

The CSA of the present invention preferably includes an upstream treatment apparatus for injecting the fuel supply with an oxidizing gas at a second location prior to the fuel supply being directed by the fuel inlet manifold.

The preferred embodiment of the present invention being such that the fuel supply is repeatedly injected with an oxidizing gas at critical locations along the CSA so that the fuel supply and the oxidizing gas chemically react to reduce harmful contaminants within the fuel supply.

These and other objectives of the present invention, and their preferred embodiments, shall become clear by consideration of the specification, claims and drawings taken as a whole.

BRIEF DESCRIPTION OF THE DRAWINGS

FIG. 5a is a simplified plan illustration of a manifold feed system, in accordance with a preferred embodiment of the present invention.

FIG. 5b is a simplified elevational illustration of a fuel turn manifold, in accordance with the embodiment shown FIG. 5a.

FIG. 6 is a simplified plan illustration of a manifold feed system, in accordance with another embodiment of the present invention.

DETAILED DESCRIPTION OF THE PREFERRED EMBODIMENT

Figure 1:
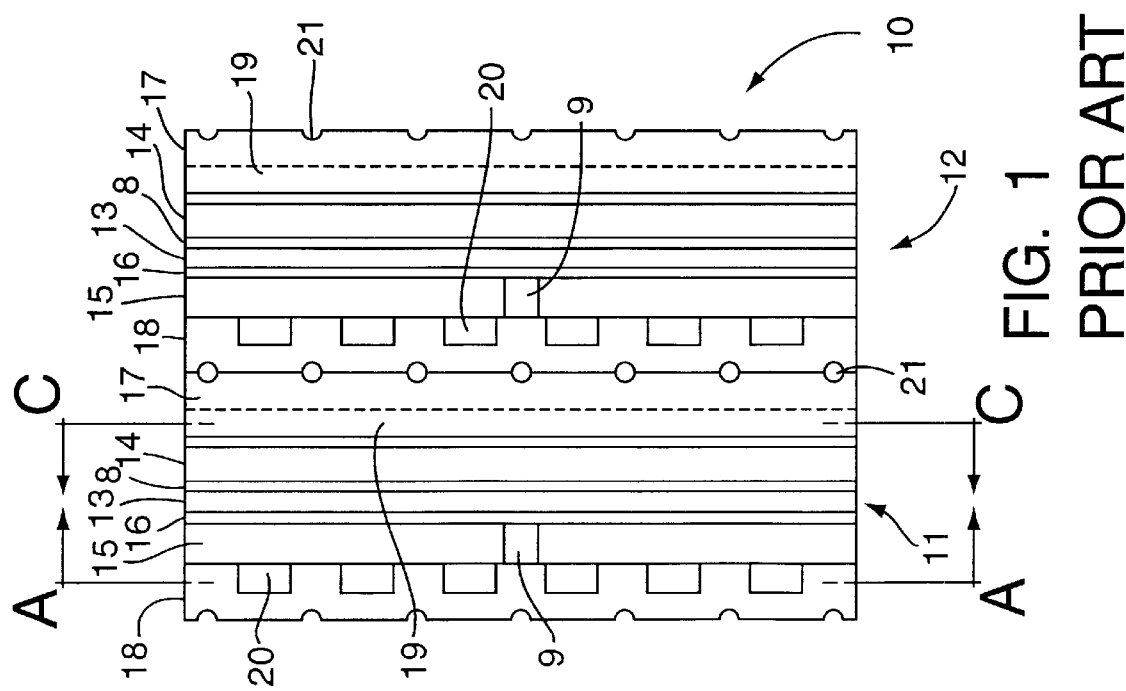
FIG. 1 illustrates a section taken through two fuel cells arranged in series.

FIG. 1 illustrates a sectional view of a partial fuel cell stack assembly 10 having two electrochemical fuel cells, 11 and 12, arranged in series contact. Each fuel cell, 11 and 12, produces only approximately 0.6–0.7 V. In order to produce a desired power supply it is necessary for a great many fuel cells to be joined in series in what is commonly referred to as a fuel cell stack assembly (CSA). The fuel cells 11 and 12 each employ an ion exchange membrane 13 consisting of a solid polymer electrolyte disposed between an anode electrode substrate 15 and a cathode electrode substrate 14. The ion exchange membrane 13 is also referred to as a proton exchange membrane (PEM) and can be a plastic-type film approximately 0.001 inch thick. The cathode and the anode electrode substrates, 14 and 15 respectively, are formed of porous, electrically conductive sheet material—typically, carbon fiber paper having a Teflon® coating.

The ion exchange membrane 13 has a catalyst layer on either side of the membrane 13, thereby forming a catalyst-membrane interface which acts to promote the desired electrochemical reaction. The anode catalyst 16 and the cathode catalyst 8 are typically chosen from one of the noble metals, such as platinum, or a noble metal alloy, such as platinum-ruthenium, or the like. The anode electrode substrate 15 in the fuel cell 11 and the cathode electrode substrate 14 in the fuel cell 12 are then electrically coupled in order to provide a path for conducting electrons between the fuel cells 11 and 12 when an external load is applied.

Fuel is supplied to the anode electrode substrate 15 through fuel channels 20 formed within an anode field flow plate 18, while an oxidant is supplied to channels 19 within a cathode field flow plate 17. The fuel and oxidant together are referred to as reactants. The fuel channels 20 are typically arranged approximately orthogonal to the oxidant channels 19.

In operation, hydrogen fuel permeates the porous electrode material of the anode electrode substrate 15 and reacts at the anode catalyst 16 to form hydrogen protons and electrons. The hydrogen protons migrate through the membrane 13 to the cathode electrode substrate 14. The electrons produced at the anode electrode substrate 15 in the fuel cell 12 migrate to the cathode electrode substrate 14 in the fuel cell 11, through the anode field flow plate 18 of the fuel cell 12 and the cathode field flow plate 17 of the fuel cell 11. At the cathode electrode substrate 14, the oxidant also permeates through the porous electrode material and reacts with the hydrogen ions and electrons from the anode electrode substrate 15 at the catalyst layer 16 to form the by-product water. Not only does the ion exchange membrane 13 facilitate the migration of these hydrogen ions from the anode 15 to the cathode 14, but the ion exchange membrane 13 also acts to isolate the hydrogen fuel coursing through fuel channels 20 from the oxygen-containing gas oxidant as it moves through the oxidant channels 19. A coolant, typically in the form of water, is supplied to the fuel cells 11 and 12 through coolant channels 21 formed in the anode and cathode field flow plates, 18 and 17 respectively, for the purpose of removing excess heat generated by the electrochemical reaction taking place within fuel cells 11 and 12.

While a PEM and carbon fiber paper having a Teflon® coating have been described, the present invention is not limited in this regard as other membranes and electrode materials may be alternatively utilized, providing they allow for the necessary flow of reactant and product molecules, electrons and ions. Likewise, fuel cells having non-solid acid based electrolytes may also be employed without departing from the broader aspects of the present invention.

Figure 2:
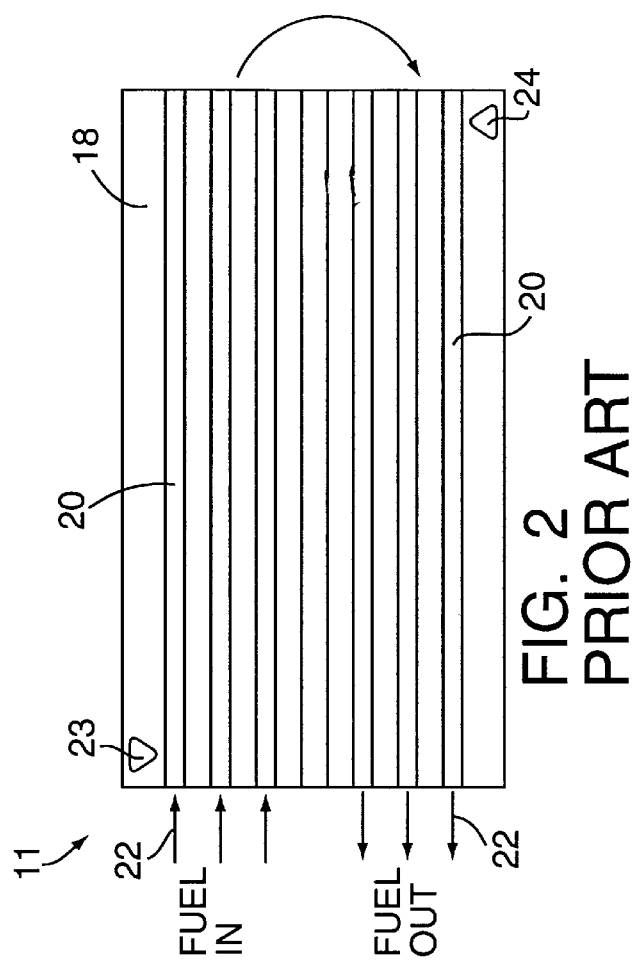
FIG. 2 is a simplified plan illustration of an anode side of a fuel cell, taken in section along line A of FIG. 1.

FIG. 2 illustrates a section taken along line A of FIG. 1 showing a plan view of the anode side of, for example, the fuel cell 11, including the fuel channels 20 of the anode field flow plate 18. As can be seen from FIG. 2, a fuel supply 22 is supplied to one half of the fuel cell 11 and travels the length of the fuel channels 20. As the fuel supply 22 exits fuel cell 11, the fuel supply 22 is directed towards the downstream side of the fuel cell 11 by an unillustrated fuel turn manifold. In this way, the fuel supply 22 is exposed to the entire anode side of the fuel cell 11. It should be readily apparent that were the single fuel cell 11 but one in a stack assembly of fuel cells, one half of each fuel cell so stacked would receive the fuel supply 22 initially, while the other half of each fuel cell in the stack would receive fuel supply 22 after redirection by the unillustrated fuel turn manifold. Additionally, FIG. 2 shows axial inlet and outlet coolant manifolds, 23 and 24 respectively, which are utilized for supplying a water coolant to a plurality of coolant channels 21. The architecture of FIG. 2 represents a two-pass flow system owing to the fuel supply 22 making two passes across the surface of the anode field flow plate 18 of the fuel cell 11. A greater number of passes may also be arranged with a corresponding increase in the number of fuel turn manifolds, such as will be illustrated in conjunction with FIG. 6.

Figure 3:
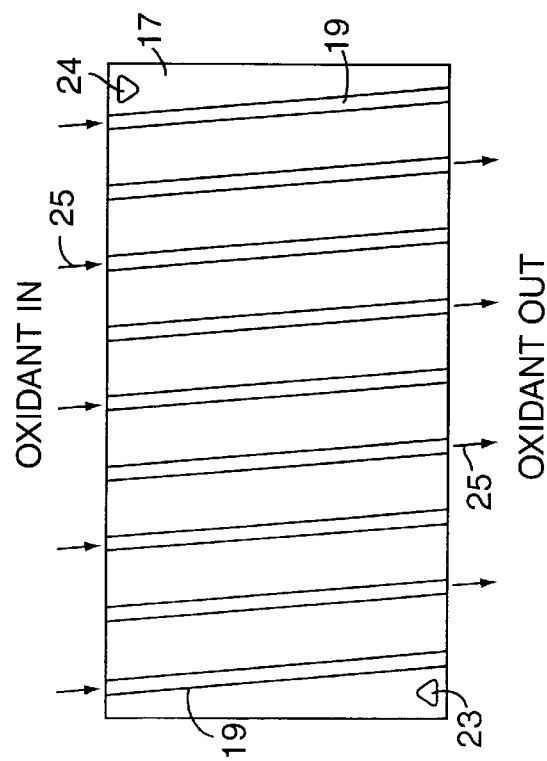
FIG. 3 is a simplified plan illustration of an cathode side of a fuel cell, taken in section along line C of FIG. 1.

FIG. 3 illustrates a section taken along line C of FIG. 1 showing a plan view of the cathode side of, for example, the fuel cell 11, including the oxidant channels 19 of the cathode field flow plate 17. As can be seen from FIG. 3, an oxidant stream 25 is supplied to one entire side of the fuel cell 11 and travels the length of the oxidant channels 19 until emerging at the far side thereof. In this way the entire cathode side of the fuel cell 11 is exposed to the oxidant stream 25 without the use of an oxidant turn manifold. It should be readily apparent, however, that the oxidant fuel stream 25 may also be configured to incorporate an oxidant turn manifold to produce an oxidant flow pattern similar to the fuel supply pattern as illustrated in FIG. 2. Additionally, FIG. 3 also shows axial inlet and outlet coolant manifolds, 23 and 24, which are utilized for supplying a coolant such as water to a plurality of coolant channels 21.

It should be readily apparent that the anode and cathode field flow plates, 18 and 17, may alternatively have any number of fuel and oxidant channels, linear or not, as long as the fuel cell 11 is adequately supplied with these reactants.

In operation, it is desired that pure hydrogen be utilized as the fuel supply for the fuel cells 11 and 12 shown in FIG. 1, but such pure hydrogen is often difficult and expensive to obtain and store. Other hydrocarbons such as methane, natural gas and gasoline are therefore utilized as a fuel, but only after these hydrocarbons have undergone a known reformation process to convert the hydrocarbons to a hydrogen rich fuel having a minimal amount of impurities within the fuel supply. As discussed previously, and of major concern in the present invention, is the amount of carbon monoxide (CO) present in the fuel supply. Even small concentrations of CO amounting to 0.05% (500 ppm) of the fuel supply can severely damage the operation of a fuel cell by reacting with the catalyst, thereby impeding the reaction of the hydrogen fuel with the catalyst.

It is known to treat the incoming fuel supply to a fuel cell stack assembly by injecting the fuel supply with an oxidant, such as oxygen or oxygen-containing air. The fuel supply and oxygen chemically react at the catalyst to reduce the amount of CO and form carbon dioxide ($CO_2$) which does not detrimentally react with the catalyst. A process and apparatus for treating an incoming fuel supply may be such as is disclosed by the assignee of the present invention within U.S. Pat. No. 5,330,727, incorporated herein by reference in its entirety.

Among the problems associated with injecting oxygen into a fuel supply at only one location is that a large quantity of oxygen need be injected at this one location in an effort to provide the fuel supply with sufficient oxygen content along the entire length of the fuel path through the fuel cell stack assembly. There is, however, an undesirable excess quantity of oxygen at the beginning of the fuel path. The excess oxygen causes an increase of heat generating reactions with the hydrogen in the fuel supply, such as the formation of water, as described previously.

Furthermore, the amount of oxygen within the fuel supply drops significantly as the fuel supply passes through the fuel cell stack. This drop in oxygen level has the effect of increasing a reverse water shift reaction within the fuel cell stack. The reverse water shift reaction produces additional CO and thereby further poisons the operation of the fuel cell stack by detrimentally reacting with the anode catalyst, as was also described previously.

It is therefore a major aspect of the present invention to provide a fuel cell stack with an oxygen injection system wherein the heat generated as a result of oxidizing the fuel supply is not localized at any one area of the fuel cell stack, as well as ensuring that additional CO is not produced in the fuel cell stack downstream of the fuel inlet manifold. The present invention, therefore, proposes to supplement an oxygen injection of the fuel supply at the fuel inlet manifold with at least one other oxygen injection location at a point further downstream from the fuel inlet manifold, as is discussed in more detail below.

Figure 4A:
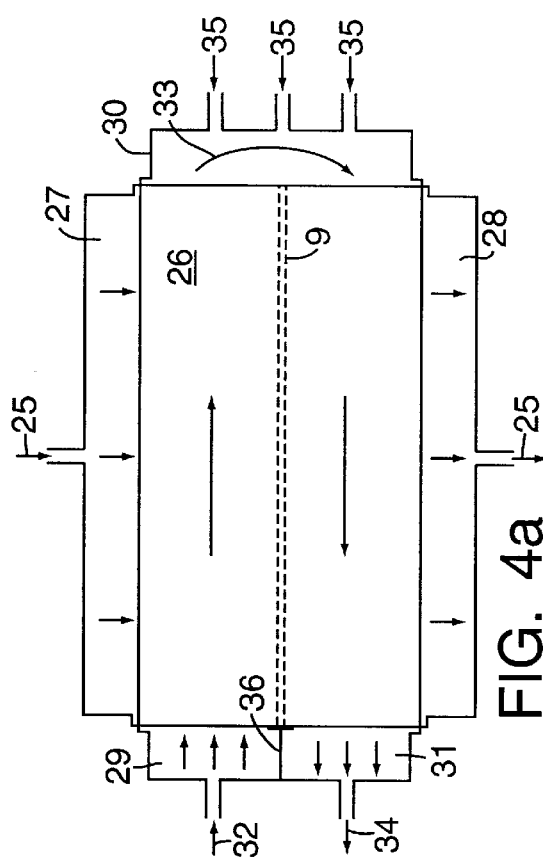
FIG. 4a is a simplified plan illustration of a manifold feed system, in accordance with one embodiment of the present invention.

FIG. 4a illustrates one embodiment of the present invention wherein a fuel cell stack assembly 26 is viewed in plan form. The fuel cell stack assembly 26 is equipped with an oxidant inlet manifold 27 which is attached to one side of the fuel cell stack assembly 26 in a gas-tight manner by a combination of non-illustrated fasteners and seals. The oxidant inlet manifold 27 accepts an incoming oxidant stream 25 from a non-illustrated oxidant supply and directs the oxidant stream 25 through the oxidant channels 19 in the cathode field flow plates 17 for each fuel cell in the fuel cell stack assembly 26. Spent oxidant is subsequently exhausted from the fuel cell stack assembly 26 through an oxidant exhaust manifold 28, also attached to an opposing side of the fuel cell stack assembly 26 in a gas-tight manner by a combination of non-illustrated fasteners and seals.

The fuel cell stack assembly 26 is further equipped with a fuel inlet manifold 29 which is attached to one side of the fuel cell stack assembly 26 in a gas-tight manner by a combination of non-illustrated fasteners and seals. The fuel inlet manifold 29 accepts an incoming oxygen-treated fuel stream 32 consisting of reformed fuel which has been previously treated with a supply of oxygen by a fuel treating apparatus as is disclosed in U.S. Pat. No. 5,330,727, or the like. The fuel inlet manifold 29, akin to the oxidant inlet and exhaust manifolds 27 and 28, runs the length of the fuel cell stack assembly 26, but only covers approximately half of each fuel cell. The oxygen treated fuel stream 32 is directed in a first pass through approximately one half of the fuel channels 20 in the anode field flow plate 18 of each fuel cell in the fuel cell stack assembly 26. In doing so, the oxygen-treated fuel stream 32 is gradually depleted of oxygen through the ongoing chemical reaction with the CO present in the fuel supply. Upon emerging from the fuel channels 20 initially supplied with the oxygen treated fuel stream 32, a fuel turn manifold 30 accepts the now oxygen-depleted fuel stream 33.

It is therefore a major aspect of the present invention that the oxygen-depleted fuel stream 33 which enters the fuel turn manifold 30 be given an additional injection of oxygen by oxidant streams 35, which may be air or another oxygen-containing gas, before the oxygen-depleted fuel stream 33 is directed in a second pass back through the fuel cell stack assembly 26. The oxidant streams 35 are supplied by a non-illustrated source of oxygen, such as an air blower, and serve to inject a measured amount of oxygen-containing gas into the oxygen-depleted fuel stream 33 entering the fuel turn manifold 30. In this way, the fuel supply is repeatedly injected with an oxidizing agent and has an approximately uniform concentration of oxygen as it transverses the entirety of the fuel channels 20 of each fuel cell in the fuel cell stack assembly 26.

Spent fuel 34 which has finished circulating through the fuel cell stack assembly 26 is subsequently exhausted from the fuel cell stack assembly 26 through a fuel exhaust manifold 31, also attached to an opposing side of the fuel cell stack assembly 26 in a gas-tight manner by a combination of non-illustrated fasteners and seals. The fuel inlet and exhaust manifolds, 29 and 31 respectively, are located adjacent to one another and separated by a flow divider 36 for ensuring that spent fuel 34 arriving at the fuel exhaust manifold 31 does not mix with the hydrogen-rich oxygen treated fuel stream 32 being supplied to the fuel inlet manifold 29.

As described previously in conjunction with the operation of an electrochemical fuel cell, the anode and cathode electrodes, 15 and 14 respectively as seen in FIG. 1, are gas permeable to allow the catalyst layer 16 to be reached by each reactant. The permeability of the anode electrode 15, however, would also allow for the lateral diffusing or flow of the oxygen treated fuel stream 32 from the approximately one half of the fuel cell being subjected to the first pass of the oxygen treated fuel stream 32, to the other approximately half of the fuel cell being subjected to the second pass of the oxygen treated fuel stream, thereby affecting the uniform distribution of fuel within each half of the anode side of a fuel cell. In order, therefore, to effectively separate the two halves of the anode side of a fuel cell and their corresponding fuel channels 20, the anode electrode 15 is impregnated with a seal 9 of non-porous material, seen in section in FIG. 1, which runs the length of each fuel cell and effectively prevents this undesired diffusion. More than one seal 9 may be impregnated in the anode electrode 15 in order to create a plurality of fuel flow passes through each fuel cell, as will be described later in conjunction with FIG. 6. While the seal 9 has been described as being non-porous, the present invention is not limited in this regard as any suitable material, such as a hydrophilic material capable of absorbing excess water, and thereby filling up any pores within the seal 9, may alternatively be utilized without departing from the broader aspects of the present invention.

Supplying oxidant streams 35 to the fuel turn manifold 30, in addition to an oxidizing treatment of the initial fuel stream with oxygen, produces several beneficial effects. With oxygen being added to the fuel cell at a plurality of different areas, the heat generated by an oversupply of oxygen at any given location within the fuel cell stack assembly is avoided. That is, any reactionary heat is more uniformly spaced over the entire area of the fuel cell. This heat dispersion allows the fuel cell to operate at lower temperatures and thereby increases fuel cell life, preserves the integrity of the ion membrane 13 and ensures a consistent electrical output.

Also, the additional influx of oxidant streams 35 at the fuel turn manifold 30 serves to keep the level of oxygen in the fuel stream more uniform. As described previously, an oxygen-depleted fuel stream provides an environment where a reverse water shift reaction takes place, thereby producing additional CO downstream from the fuel inlet manifold 29. The additional injection of oxygen by oxidant streams 35 replenishes the oxygen within the fuel stream and correspondingly reduces the amount of degenerative CO produced by backshifting in the fuel stream as it passes through the fuel cell.

It has also been discovered that the additional injection of oxygen by oxidant streams 35 at the fuel turn manifold 30 actually reduces the overall oxygen requirement of each fuel cell within the fuel cell stack assembly 26. With less oxygen required, the fuel cell stack becomes more efficient, less costly to operate and produces less total generated heat.

Figure 4B:
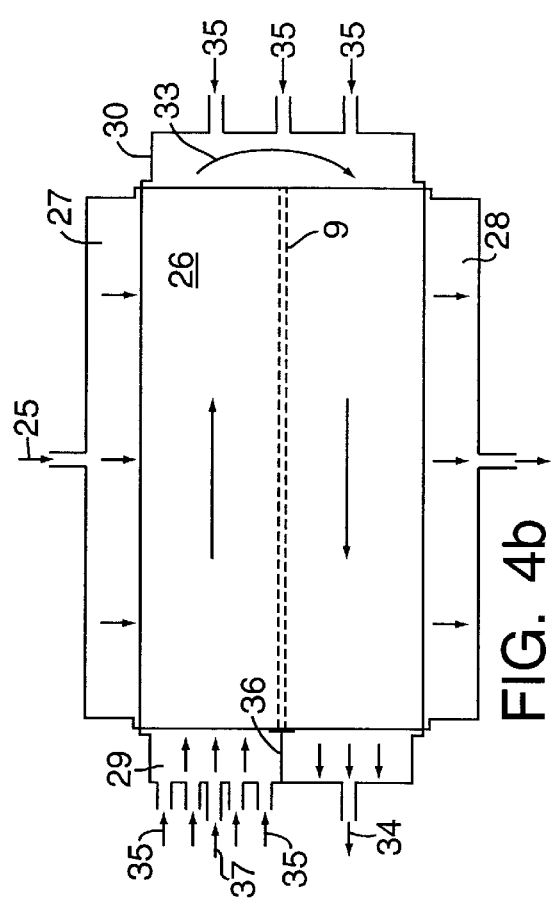
FIG. 4b is a simplified plan illustration of a manifold feed system, in accordance with another embodiment of the present invention.

Another embodiment of the present invention is illustrated by FIG. 4b, containing similar nomenclature for similar devices as that of FIG. 4a. In FIG. 4b, however, the fuel inlet manifold 29 accepts a non-oxygen treated fuel supply 37, as well as a plurality of oxidant streams 35. With this configuration, the fuel supply 37 is not mixed with an oxygen supply until they are both provided to the fuel inlet manifold 29. As discussed previously, introducing the oxidant streams 35 in the fuel turn manifold 30 results in less total oxygen being utilized, as well as proportionally reducing the amount of oxygen needed to be introduced at any one location along the fuel stream of the fuel cell stack assembly 26.

The embodiments shown in FIGS. 4a and 4b illustrate the introduction of oxidant streams 35 into the fuel inlet and turn manifolds, 29 and 30. It is important, however, that the injected oxidant streams 35 be well mixed with the circulated fuel stream for best results. FIG. 5a illustrates a preferred embodiment of the present invention where zones of high velocity turbulent gas flows are produced to effectuate more complete mixing of the fuel stream and injected oxygen.

FIG. 5a contains similar nomenclature for similar devices as that of FIGS. 4a and 4b. The fuel inlet manifold 29 of FIG. 5a accepts a non-oxygen treated fuel supply 50 through a fuel inlet conduit 52. An oxygen containing stream 55 is injected at a discrete point along the fuel inlet conduit 52 before the fuel supply 50 enters the fuel inlet manifold 29. Unlike mixing the fuel and oxygen flows within the comparably large area of the fuel inlet manifold 29, as was described in FIG. 4b, the arrangement of FIG. 5a creates a zone of high turbulence gas flows and provides for a complete mixing of the fuel supply 50 and the oxygen stream 55. After the treated fuel supply 50 is directed through one half of each of the anodes in the fuel cell stack assembly 26, the fuel supply 50 is redirected to the remaining half of the anodes in the fuel cell stack assembly 26 by way of a fuel turn manifold 30.

In order to provide for similar mixing between the now oxygen-depleted fuel supply 53 and the injected oxygen containing streams 55, a flow divider 57 is utilized. The flow divider 57 does not completely separate the fuel turn manifold 30, but rather provides another zone of high turbulence gas flows by creating a narrowed location within the fuel turn manifold 30. The now oxygen-depleted fuel supply 53 is injected with a plurality of oxygen containing streams 55 at this narrowed location and thereby ensures complete mixing. FIG. 5b illustrates an elevational view of the fuel turn manifold 30 showing multiple injection points for the oxygen containing streams 55 along the section narrowed by the flow divider 57. As discussed in conjunction with previous embodiments, introducing the oxygen containing streams 55 in the fuel turn manifold 30 results in less total oxygen being utilized, as well as proportionally reducing the amount of oxygen needed to be introduced at any one location along the fuel cell stack assembly 26. It will be readily apparent that both the fuel inlet conduit 52 and the fuel turn manifold 30 may be provided with any number of oxygen containing streams 55.

In operation, each fuel inlet and turn manifold, 29 and 30 respectively, would be regulated to receive a percentage of the total oxygen utilized by the anodes in the fuel cell stack assembly 26 in approximate proportion to the area which each manifold services. For example, in a fuel cell stack assembly 26 where each individual fuel cell has a centrally located seal 9, as is illustrated in FIGS. 4a, 4b and 5a, the fuel inlet manifold 29 and the fuel turn manifold 30 each service approximately one-half of the anodes of the entire fuel cell stack assembly 26. Therefore, of the total amount of oxygen added to the entire fuel cell stack assembly 26, approximately 50% of this oxygen would be regulated to be added adjacent the fuel inlet manifold 29 and another approximately 50% would be regulated to be added at the fuel turn manifold 30. Alternatively, the quantity of oxygen added to the fuel stream at each manifold may be proportional to the product of the average current density in each portion of the fuel cell stack assembly 26 serviced by each manifold, multiplied by the area of each portion. The average current density can be established by utilizing an analytical model of the fuel cell stack assembly 26, the particulars of which are not the focus of the present invention, however, the average current density represents the amps per square foot (ASF) generated by each portion of the fuel cell stack assembly in relation to the type of fuel cell utilized, the flow rates and composition of the reactants, as well as operating temperature and age of the fuel cell stack assembly.

If, however, a particular fuel cell stack had individual anodes in the fuel cells each having a plurality of seals 9, the percentage of oxygen that each manifold would receive may differ depending on the placement of the seals 9 and the expected hydrogen and carbon monoxide content of the fuel stream. FIG. 6 illustrates this point and provides another embodiment of the present invention. As shown in FIG. 6, a fuel cell stack 40 is comprised of a plurality of individual fuel cells, each having two seals 9 for isolating one portion of the fuel cell anode from any other when a fuel supply flows through the fuel cell stack 40. The fuel cell stack 40 is equipped with an oxidant inlet manifold 27 which accepts an incoming oxidant stream 25 from a non-illustrated oxidant supply and directs the oxidant stream 25 through the oxidant channels 19 in the cathode field flow plates 17 for each fuel cell in the fuel cell stack 40. Spent oxidant is subsequently exhausted from the fuel cell stack 40 through an oxidant exhaust manifold 28.

The fuel cell stack 40 of FIG. 6 is further equipped with a fuel inlet manifold 41 which accepts a fuel supply 50 through a fuel inlet conduit 52. An oxygen containing stream 55 is injected at a discrete point along the fuel inlet conduit 52 before the fuel supply 50 enters the fuel inlet manifold 29 thereby creating a zone of high turbulence gas flows and provides for a complete mixing of the fuel supply 50 and the oxygen containing stream 55. After the treated fuel supply 50 is directed through one portion of each of the fuel cell anodes in the fuel cell stack 40, the now oxygen-depleted fuel supply 53 is redirected to another portion of the fuel cell stack 40 by way of a first fuel turn manifold 42.

In order to provide for similar mixing between the now oxygen-depleted fuel supply 53 and the injected oxygen containing streams 55, a flow divider 57 is utilized. The flow divider 57 does not completely separate the first fuel turn manifold 42, but rather provides another zone of high turbulence gas flows by creating a narrowed location within the first fuel turn manifold 42. The now oxygen-depleted fuel supply 53 is injected with a plurality of oxygen streams 55 at this narrowed location and thereby ensures complete mixing.

A similar number of oxygen containing streams 55 are injected into the oxygen-depleted fuel supply 53 being redirected by the second fuel turn manifold 43. The fuel inlet manifold 41, akin to the fuel inlet manifolds 29 of FIGS. 4a and 4b, runs the length of the fuel cell stack 40, but the first pass only feeds approximately 55% of each fuel cell anode. The first fuel turn manifold 42 is arranged to feed the next approximately 30% of each fuel cell anode, while the second fuel turn manifold 43 is arranged to feed approximately the remaining 15% of the fuel cell anode. According to the configuration shown in FIG. 6, therefore, of the total amount of oxygen added to the anodes of the entire fuel cell stack 40, approximately 55% of this oxygen containing gas would be added adjacent the fuel inlet manifold 41, approximately 30% of this oxygen containing gas would be added at the first fuel turn manifold 42 and another approximately 15% would be added at the second fuel turn manifold 43. In this way, heat generation and the location of oxygen inputted to a fuel cell stack may be customized by forming any number of seals 9 and corresponding fuel turn manifolds 42 and 43 in relation to the specific design criteria utilized when manufacturing the fuel cell stack 40. Alternatively, the quantity of oxygen added at each manifold may be proportional to the product of the average current density in each section of the fuel cell stack 40 serviced by each manifold, multiplied by the area of each section. The average current density can be established by utilizing an analytical model of the fuel cell stack 40, the particulars of which are not the focus of the present invention, however, the average current density represents the amps per square foot (ASF) generated by each portion of the fuel cell stack assembly in relation to the type of fuel cell utilized, the flow rates and composition of the reactants, as well as operating temperature and age of the fuel cell stack assembly.

The fuel and coolant manifolds according to the previously described embodiments of the present invention are sealed to the fuel cell stack so as to be in fluid communication with the fuel cell stack. As utilized herein, fluid communication encompasses both gaseous and liquid communication.

It should be readily apparent that while a particular fuel cell stack 40 has been described, the present invention is not limited in this regards as other fuel cell arrangements, such as a cascade arrangement, may be utilized without departing from the broader aspects of the present invention. Also, the fuel inlet conduit 52 and the fuel turn manifolds, 42 and 43, may be provided with any number of oxygen containing streams 55.

While the invention had been described with reference to the preferred embodiments, it will be understood by those skilled in the art that various obvious changes may be made, and equivalents may be substituted for elements thereof, without departing from the essential scope of the present invention. Therefore, it is intended that the invention not be limited to the particular embodiments disclosed, but that the invention includes all embodiments falling within the scope of the appended claims.

What is claimed is:

1. A method for utilizing a plurality of gas injection locations for treating a fuel supply in a fuel cell stack assembly having a plurality of fuel cells, comprising the steps of:

directing said fuel supply to a first portion of said fuel cell stack assembly;

exhausting said fuel supply from said fuel cell stack assembly after said fuel supply has traveled a fuel path through said fuel cell stack assembly; and injecting a first quantity of said oxidizing gas into said fuel supply at a first location along said fuel path downstream of said first portion of said fuel cell stack assembly but before exhausting said fuel supply.

2. The method for utilizing a plurality of gas injection locations for treating a fuel supply in a fuel cell stack assembly having a plurality of fuel cells according to claim 1, further comprising the steps of:

injecting a second quantity of an oxidizing gas into said fuel supply at a second location prior to said fuel supply being directed to said fuel cell stack assembly.

3. The method for utilizing a plurality of gas injection locations for treating a fuel supply in a fuel cell stack assembly having a plurality of fuel cells according to claim 2, further comprising the steps of:

accepting said fuel supply after it has been directed through said first portion of said fuel cell stack assembly; and redirecting said fuel supply from said first portion of said fuel cell stack assembly back through a second portion of said fuel cell stack assembly.

4. The method for utilizing a plurality of gas injection locations for treating a fuel supply in a fuel cell stack assembly having a plurality of fuel cells according to claim 3, further comprising the steps of:

injecting said first quantity of said oxidizing gas when said fuel supply is accepted and redirected.

5. The method for utilizing a plurality of gas injection locations for treating a fuel supply in a fuel cell stack assembly having a plurality of fuel cells according to claim 4, further comprising the steps of:

injecting an approximately equal percentage of said first and second quantity of oxidizing gas.

6. The method for utilizing a plurality of gas injection locations for treating a fuel supply in a fuel cell stack assembly having a plurality of fuel cells according to claim 4, further comprising the steps of:

injecting said first and second quantity of oxidizing gas in a percentage approximately proportional to an area of said fuel cell stack assembly being fed by each of said injections.

7. The method for utilizing a plurality of gas injection locations for treating a fuel supply in a fuel cell stack assembly having a plurality of fuel cells according to claim 4, further comprising the steps of:

injecting said first and second quantity of oxidizing gas in a percentage approximately proportional to an average current density in a portion of said fuel cell stack being fed by each of said downstream and upstream treatment means multiplied by the area of each section.

* * * * *